United States Patent [19]
Zayatz

[11] 4,359,818
[45] Nov. 23, 1982

[54] COATED ANODE FOR LITHIUM HALOGEN CELLS

[75] Inventor: Robert A. Zayatz, North Tonawanda, N.Y.

[73] Assignee: Wilson Greatbatch Ltd., Clarence, N.Y.

[21] Appl. No.: 222,499

[22] Filed: Jan. 5, 1981

[51] Int. Cl.³ .................... H01M 2/14; H01M 2/18
[52] U.S. Cl. ............................................. 29/623.1
[58] Field of Search .............. 429/178, 181, 184, 194, 429/211, 191, 192, 213; 29/623.1, 623.2, 623.4

[56] References Cited

U.S. PATENT DOCUMENTS

| | | | |
|---|---|---|---|
| 3,957,533 | 5/1976 | Mead et al. | 136/83 R |
| 4,166,158 | 8/1979 | Mead et al. | 429/181 |
| 4,182,798 | 1/1980 | Skarstad | 29/623.1 |
| 4,210,708 | 7/1980 | Mead et al. | 429/181 |

Primary Examiner—Francis S. Husar
Assistant Examiner—Jonathan L. Scherer
Attorney, Agent, or Firm—Christel, Bean & Linihan

[57] ABSTRACT

A film of organic electron donor material is formed to a predetermined thickness and shape and then the preformed film and a lithium element are pressed together in a manner bonding the film to the surface of the lithium element to form a coated lithium anode. During the pressing operation, the surface of the lithium element can be shaped to include formations such as corrugations which serve to increase the surface area thereof, and the pressure bonded film is of substantially uniform thickness over these formations. The resulting coating also is substantially free of voids so as to be of substantially uniform solidity. An entire coated anode assembly is formed in one pressing operation, so that bare lithium is not subjected to prolonged atmospheric exposure which, in turn, reduces or substantially eliminates the possibility of nitride formation on the surface of the lithium element which is coated simultaneously while being pressed. The resulting anode is for use in a lithium-halogen cell wherein the cathode contains a charge transfer complex of an organic donor component and halogen, and the material of the film can be the same as the organic donor component material of the charge transfer complex, for example polyvinyl pyridine.

11 Claims, 3 Drawing Figures

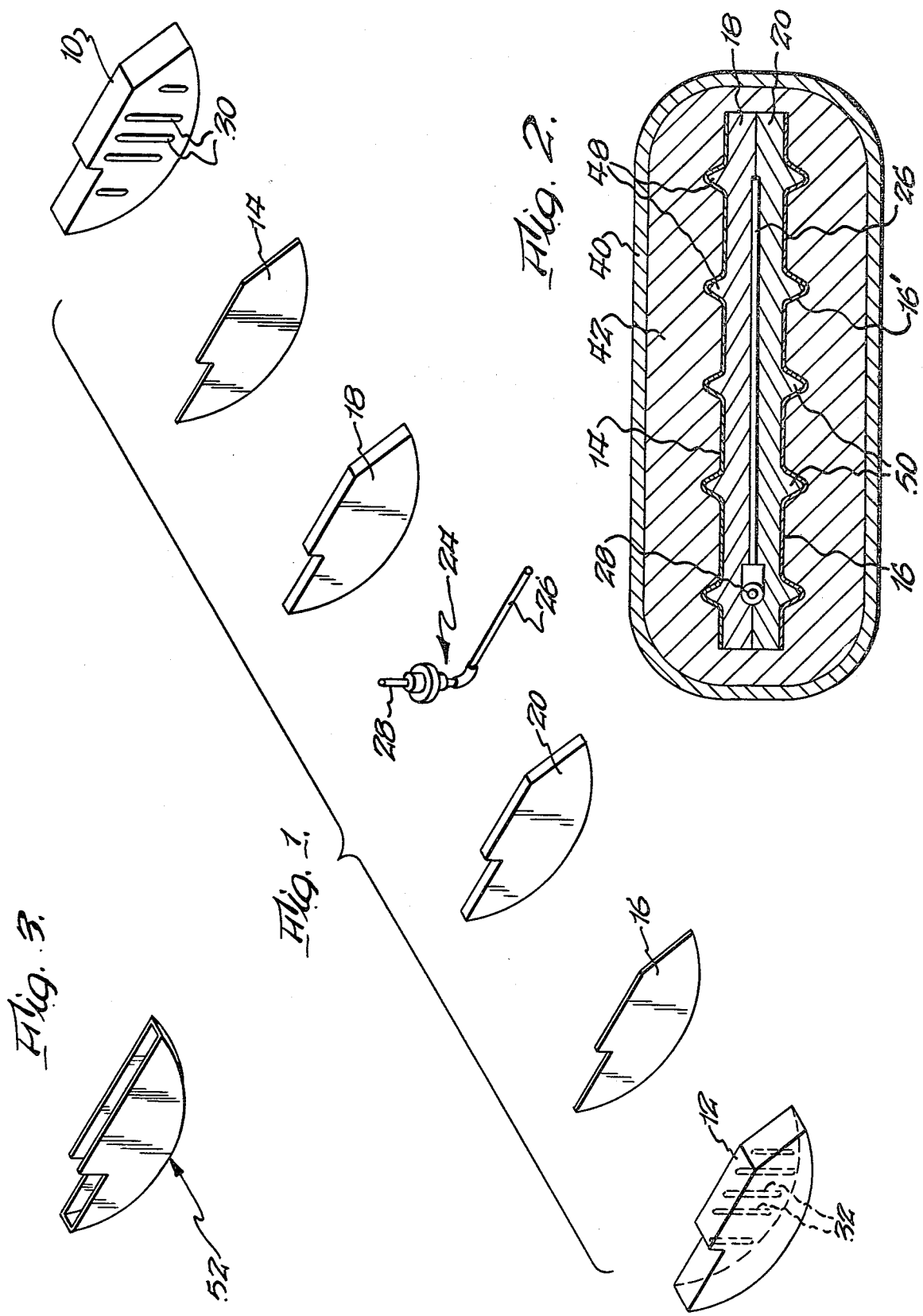

COATED ANODE FOR LITHIUM HALOGEN CELLS

BACKGROUND OF THE INVENTION

This invention relates to the conversion of chemical energy to electrical energy, and more particularly to a new and improved anode construction for lithium-halogen cells and a method of making the same.

One area of use of the present invention is in providing electrical power to inaccessible devices in the human environment, for example to an implanted cardiac pacemaker, although the principles of the present invention can be variously applied. Lithium-iodine batteries are available for such use which advantageously have an open circuit voltage about twice that of the mercury cell, do not generate gas during operation, and have a non-corrosive electrolyte.

It is desirable to provide a lithium-halogen cell and anode construction having a relatively low cell impedance and having a relatively constant long-term cell impedance. The foregoing has been accomplished by applying to the lithium anode a coating of an organic electron donor material. It would be highly desirable to provide such a method which can be performed relatively quickly, which results in an anode coating of substantially uniform solidity and thickness, where thickness can be varied as required. It also would be highly desirable to provide such a method which results in an anode coating which reduces or substantially eliminates the possibility of nitride formation on the surface of the lithium element which is coated and provides a coated anode resulting in reduced cell electrical impedance when used in a lithium-halogen cell.

SUMMARY OF THE INVENTION

It is, therefore, a primary object of this invention to provide a new and improved method of making an anode for a lithium-halogen cell.

It is a more particular object of this invention to provide a new and improved method of making a coated lithium anode.

It is a further object of this invention to provide such a method resulting in an anode coating of substantially uniform solidity and thickness which is free of bubbles.

It is a further object of this invention to provide such a method which can be performed relatively quickly.

It is a further object of this invention to provide such a method which reduces or substantially eliminates the possibility of nitride formation on the surface of the lithium element which is coated.

It is a further object of this invention to provide such a method which provides a coated anode which results in a lithium halogen cell of improved electrical characteristics.

It is a further object of this invention to provide such a method which provides a coated anode which results in a lithium halogen cell with constantly assured higher depolarizer pour weights and consequently increasing ampere-hour ratings.

The present invention provides a method of making a coated lithium anode for lithium halogen cells wherein a film of organic electron donor material is formed to a predetermined thickness and shape and then the preformed film and a lithium element are pressed together to form a coated lithium anode. In particular, sufficient pressure is applied to bond the film to a surface of the lithium element. During the pressing operation, the surface of the lithium element can be shaped to include formations such as ripples or corrugations which serve to increase the surface area thereof and the pressure bonded film is of substantially uniform thickness over these formations. The resulting anode is for use in a lithium-halogen cell wherein the cathode contains a charge transfer complex of an organic donor component and halogen, and the material of the film can be the same as the organic donor component material of the charge transfer complex, for example polyvinyl pyridine.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a developed view illustrating the method of the present invention;

FIG. 2 is a sectional view of a lithium halogen cell including a coated anode according to the present invention; and FIG. 3 is a perspective view of an alternative form of the film which can be used in the method of the present invention.

DETAILED DESCRIPTION OF AN ILLUSTRATIVE EMBODIMENT

In a basic coated anode for a lithium halogen cell, an organic electron donor material, for example polyvinyl pyridine, is dissolved in an organic solvent, for example tetrahydrofuran, and applied such as by brushing in liquid form onto a surface of the lithium anode after the anode has been pressed or otherwise formed, and the application of the liquid such as by brushing usually is done a number of times to build up a coating of desired thickness. In accordance with the present invention, a film of an organic electron donor material, for example polyvinyl pyridine, is preformed to a predetermined thickness and shape or configuration. A lithium element is provided having a surface adapted to be operatively associated with the cathode in the lithium halogen cell, and the preformed film is placed on the surface of the lithium element. Pressure is applied to bond the film to the surface of the lithium element to form a coated lithium anode. Advantageously, the entire coated anode assembly is formed in one pressing operation which provides an anode coating of substantially uniform solidity and thickness. In addition, because the film coating is pressed during the anode forming operation, the bare lithium element is not exposed to delays in the atmosphere for varying periods of time thereby reducing or substantially eliminating the possibility of nitride formation on the surface of the lithium element which is coated.

Referring now to the drawings, FIG. 1 is a developed view illustrating the method according to the present invention. The apparatus used in the method and the parts formed and to which the method steps are applied are shown. Thus, there are two complementary mold sections or halves 10 and 12, respectively, which during use are held in a suitable fixture (not shown), for carrying out the pressing operation. There is provided two preformed films 14 and 16, respectively, each of an organic electron donor material and a pair of lithium plates 18 and 20. While the films 14,16 typically are in the form of sheets, they can have other forms, for example the envelope 52 in FIG. 3 which will be described in detail presently. As illustrated in FIG. 1, each preformed film of organic electron donor material is operatively positioned between one of the lithium plates and a corresponding mold half-section. A subassembly generally designated 24 including an anode current collector 26 and output lead 28 is operatively positioned between the two lithium plates.

In carrying out the method of the present invention there is a step of forming a film of an organic electron donor material having a predetermined thickness and shape. In the method shown, the two identical films 14 and 16 are formed, and each film is formed in the following manner. The organic electron donor material, for example poly-2-vinyl pyridine, is prepared in liquid form whereupon it is poured into a mold which defines the desired shape or outer configuration and thickness of the resulting film. Alternatively, the film might be injection molded. The mold can be of Delrin or other suitable material. Likewise a rectangular film sheet larger than the required shape but molded or otherwise formed to the desired thickness may be poured into a predetermined mold. The formed strip or sheet can then be cut or punched by a rule die or similar device into the prescribed film configuration. The particular anode configuration shown is one of many which can be used, and of course the configuration can describe a simple rectangle or square depending upon the characteristics of the particular cell in which the anode is used. After the organic material is poured into the mold it is allowed to dry to a malleable consistency. The mold itself can define the final outer shape of each film, i.e. such as that of films 14,16 shown in FIG. 1, in which case it simply is removed from the mold for use in the method. Presently, the mold provides the film in sheet form which then is cut by suitable means, such as a rule die, to the desired outer shape or configuration such as that of films 14,16 shown in FIG. 1.

One illustrative method of making the liquid organic electron donor material for pouring into the mold is as follows. A solution of poly-2-vinyl pyridine polymer in anhydrous benzene or other suitable solvent is prepared, the poly-2-vinyl pyridine being readily commercially available. The solution is prepared with 2-vinyl pyridine present in the range from about 10 percent to about 25 percent by weight with a strength of about 17 percent by weight of 2-vinyl pyridine being preferred. In addition to 2-vinyl pyridine, 4-vinyl pyridine and 3-ethyl 2-vinyl pyridine can be used. The resulting solution is poured into the mold to form the film as previously described.

In carrying out the method of the present invention there is also a step of providing a lithium element having a surface adapted to be operatively associated with the cathode in the cell. In the method shown, the two identical lithium elements or plates 18 and 20 are provided. The surface area as well as the thickness of each of the lithium plates is determined by desired cell operating characteristics. The outer configuration or shape of each lithium plate 18,20 is determined by the construction or shape of the cell in which they are employed. Each lithium plate and the corresponding preformed film, for example, plate 18 and film 14, have similar surface areas and outer configurations. The surface area and outer configuration are similar, although it may be advantageous for the film to be slightly larger than the lithium plate.

In the method illustrated in FIG. 1, an anode subassembly is provided which includes an anode current collector 26, an anode lead 28, and at least one element for sealing and electrically insulating the anode current collector and lead from the remainder of the cell. The anode current collector can be in the form of a screen or, as shown in FIG. 1, in the form of a relatively thin lead 26 of either round or flat cross section. The anode lead 28 for making external electrical connection to the cell typically may be of a round cross section. The anode current collector and lead can be of nickel, nickel iron alloy or other suitable metal. The means for sealing the anode current collector and leads from the remainder of the cell typically includes a plurality of elements assembled together which are of a material of which in addition to being a non-conductor of electricity, also is non-reactive with halogens such as iodine, i.e. does not exhibit electronic conduction when exposed to halogens such as iodine. Two forms of material found to perform satisfactorily are fluoropolymer materials commercially available under the names Halar and Tefzel which are trademarks of the Allied Chemical Company and The Dupont Company, respectively. Other materials having these characteristics can of course be employed. For a more detailed description of typical internal structures and arrangements of the sealing means, reference can be made to U.S. Pat. Nos. 4,166,158 or 4,210,708 or to co-pending United States patent application entitled "Anode Assembly For Lithium-Halogen Cell", Serial No. 222,498 filed Jan. 5, 1981 all assigned to the assignee of this invention. The disclosures of those patents and that application are hereby incorporated by reference.

In accordance with the present invention, the preformed film of organic electron donor material is placed on a surface of the lithium element and pressure is applied to bond the film to the surface of the lithium element. In the method illustrated in FIG. 1, the two lithium plates 18,20 are brought together and against the anode current collector and lead assembly 24 so that the current collector 26 and portions of the sealing arrangement are sandwiched between the two lithium plates with the lead 28 extending out from the plates. Then the two preformed films 14 and 16 are placed against the oppositely directed exposed surfaces of the two lithium plates 18 and 20, respectively, each preformed film being positioned so that its outer configuration corresponds to or is in registry with the outer configuration of the lithium plate. The resulting assembly then is pressed together with sufficient force to bond the lithium elements 18,20 together and against the anode lead and current collector assembly 24 so as to seal the same therebetween and so that the preformed films 14,16 are bonded to the corresponding lithium plates. The foregoing is accomplished by placing the arrangement within the two mold sections 10,12 which are pressed together against the assembly and within a nesting fixture with a suitable force, for example approximately 2000 pounds of ram pressure for approximately six seconds. An example of the nesting fixture is shown in the aforementioned pending application. Removal of the resulting anode assembly from the mold sections and nesting fixture can be facilitated by employing two parting sheets, preferably of polyethylene material, one between each of the mold sections and the corresponding outer surface of the anode. In carrying out the foregoing process, it has been noted during pressing that with use of the pre-formed films 14,16 no sticking to the anode pressing fixture was encountered even though no parting sheets were used. Accordingly, the foregoing method can result in elimination of such parting sheets.

The two complementary mold sections or halves 10 and 12 are held during use in a suitable nesting fixture (not shown) for pressing the anode films 14,16 and lithium plates 18,20 therebetween to form the anode assembly. The mold sections are of a material which does not adhere to the material of the films 14,16 or to the lithium elements 18,20, and one material found to perform satisfactorily is of polyolefin material such as polyethylene or the equivalent such as that commercially available from Allied Resinous Products Inc. under the designation Resinol type F. The thickness of each of the mold sections 10,12 as shown in FIG. 1 is generally greater than the combined thickness of the corresponding lithiun plate and organic film. The surface area and outer configuration or shape of each mold section corresponds to that of the corresponding film and lithium plate, i.e. the surface area is generally greater than the film and plate and the outer configuration is at least in registry and possibly located outwardly of that of the film and plate. In the method illustrated in FIG. 1, the inner surfaces of the two mold sections 10,12 are shaped to define formations in the oppositely directed anode surfaces which increase the surface area thereof. In particular the inner surfaces of the two mold sections are shaped to define rippled or corrugated outer anode surface formations which will be described in further detail presently. The working face of mold section 10 is provided with a plurality of spaced, generally mutually parallel recesses 30 which are shaped to define the anode ribs or corrugations to be described. Each recess has a pair of side walls which meet an inner or bottom wall, and the bottom wall can be curved or arcuate and the side walls relatively straight and can be inclined or tapered outwardly to facilitate removal of the formed anode assembly from the mold sections. Similarly, the working face of mold section 12 is provided with a plurality of spaced, generally mutually parallel recesses 32 which are shaped to define the ribs or corrugations in the opposite surface of the anode assembly. Each recess 32 has a pair of side walls which meet an inner or bottom wall, and the bottom wall can be curved or arcuate and the side walls relatively straight and can be inclined or tapered outwardly to facilitate removal of the formed anode assembly from the mold.

FIG. 2 shows a coated lithium anode assembly formed according to the method of the present invention illustrated in FIG. 1 as it would appear in a completed cell including a casing or housing 40 containing cathode material 42. The cell of FIG. 2 is the type wherein casing 40 is of electrically conducting material such as stainless steel or the equivalent to serve as a cathode current collector, and cathode material 42 comprises a charge transfer complex of an organic donor material and iodine, for example poly-two-vinyl pyridine and iodine. For a more detailed description of the construction and operation of this type of cell reference may be made to the aforementioned patent and applications. As shown in FIG. 2, the oppositely-directed lithium anode elements have been formed to include spaced, generally mutually parallel ribs or corrugations which extend in a direction substantially parallel to the longitudinal axis of the anode lead, i.e. in a direction generally perpendicular to the plane of the paper as viewed in FIG. 2. In particular, ribs 48 on lithium element 18 have generally smooth outer surfaces and occupy a major portion of the surface area of plate 18 disposed toward the cathode material, and similarly ribs 50 on lithium element 20 have generally smooth outer surfaces and occupy a major portion of the surface of element 20 which is disposed toward the cathode material. The films 14 and 16 of the organic electron donor material cover the oppositely-directed surfaces of the lithium anode elements 18 and 20, respectively, and are of substantially uniform thickness over and along the anode surface.

The lithium-iodine cell shown in FIG. 2 operates in the following manner. As soon as the iodine-contaning cathode material 42 operatively contacts a lithium element, a solid lithium iodide electrolyte begins to form at the interface. In the present illustration this occurs at the outer or oppositely-disposed surfaces of the two lithium elements 18 and 20. An electrical potential difference will exist between the anode lead 28 and a terminal pin (not shown) suitably connected to the casing 40 which is of electrically conductive material and operatively contacts the iodine-contaning material 42 to serve as a cathode current collector. The mechanism by which the foregoing is accomplished is believed to include migration of lithium ions through the electrolyte whereby lithium is an ionic species in the cell. The exact mechanism by which the iodine-containing cathode material 42 and the lithium elements 18 and 20 come into operative contact through the films 14 and 16, respectively, is not known. The mechanism could involve migration of iodine ions from the material 42 through the films 14 and 16 to the elements 18 and 20, or it could involve migration of lithium ions from the elements 18 and 20 through the films 14 and 16 to the material 42.

Although the present invention has been described in connection with the pair of sheets 14,16 of the preformed film, a preformed envelope style molded film similar to that designated 52 in FIG. 3 could be employed to receive the lithium elements 18,20 and anode lead and current collector assembly 24. In particular, envelope 52 is molded or otherwise formed from the same material as films 14,16, would have the same thickness as the films, and serves to encapsulate lithium elements 18,20 and assembly 24 placed in the envelope prior to pressing. The remainder of the method including pressing is the same as that described herein with films 14,16.

One important advantage of the method of the present invention is that the anode assembly and coating is formed by one pressing operation which provides an anode coating of substantially uniform density and thickness. In particular, prior methods of applying coating material in liquid form, such as by a brush after the anode assembly, required at least the two operations of pressing and coating application. Furthermore, the coating application step usually was conducted a number of times with allowance for drying time in between, to provide a multiple layer coating to reach the coating thickness. In the method of the present invention, on the other hand, the preformed film and the lithium anode element are pressed in one operation which saves time and is more efficient. In addition, the prior method of applying liquid coating to the already formed and shaped lithium element could cause air bubbles which displace the cathode material as well as causing an uneven thickness of the applied coating, i.e. thinner at the outer tips of the ripples or corrugations and thicker in the valley-like regions in between. This in turn causes space to be occupied which could be better used by additional volume of cathode material. The method of the present invention, on the other hand, provides an anode coating of uniform solidity or density throughout with no spaces, voids or bubbles therein and of uniform thickness over the surface of the anode element. Another important advantage is that because the film and the lithium anode are formed or otherwise pressed in the same operation, there is no need to expose bare lithium elements to the atmosphere for varying periods of time. This, in turn, advantageously reduces or substantially eliminates the possibility of nitrides forming on the surface of the lithium element. As a result, there is an increased available interface between the anode and depolarizer. Another advantage is that the coated anode of the present invention results in reduced cell impedance when used in a lithium halogen cell. This is illustrated in Table I which compares cell impedance and cell voltage for lithium-iodine cells with brushed on anode coatings to cells with pressed anode coatings. In particular, cells nos. and 2 in Table I are lithium-iodine cells as described in the foregoing applications and patent wherein the coating of organic electron donor material is applied in liquid form by brushing as previously described. Cells nos. 3–12 in Table I are similar lithium-iodine cells but having a pressed anode film coating according to the present invention. For all cells the impedance was measured at 1000 hertz with a 100 kilohm resistor connected in parallel with the cell.

TABLE I

| Cell Number | Impedance In Ohms | Cell Voltage In Volts |
| --- | --- | --- |
| 1 | 25 | 2.787 |
| 2 | 28 | 2.786 |
| 3 | 22 | 2.786 |
| 4 | 19 | 2.787 |
| 5 | 19 | 2.786 |
| 6 | 27 | 2.788 |
| 7 | 23 | 2.785 |
| 8 | 23 | 2.786 |
| 9 | 24 | 2.788 |
| 10 | 22 | 2.786 |
| 11 | 21 | 2.786 |
| 12 | 18 | 2.785 |

The average of the impedance readings for cells nos. 1 and 2, the cells with the brushed on liquid coating, is 26.5 ohms and the average voltage is 2.7865 volts. The average of the impedance readings for cell nos. 3–12, the cells with a pressed coating according to the present invention, is 21.8 ohms and the average voltage is 2.7863 volts. Thus, the pressed anode coating provided by the present invention advantageously results in a significant reduction in cell impedance, i.e. a reduction of about 18% while maintaining cell voltage relatively constant.

During the simultaneous pressing and shaping of the film and lithium element to form the ripples or corrugations, the film experiences some stretching. Normally, the organic electron donor material, for example polyvinyl pyridine, from which the film is made has sufficient plasticity to accommodate such stretching. However, should there be an unusually long delay after formation of the film and before it is pressed with the lithium element, the film material may lose plasticity. To compensate for this a suitable plasticizer, of which there are many, may be added to the organic electron donor material in making the film to prolong its shelf life. An example of such a plasticizer is dioctylphthalate.

It is therefore apparent that the present invention accomplishes its intended objects. While an embodiment of the present invention has been described in detail this has been done for the purpose of illustration, not limitation.

I claim:

1. A method of making a lithium anode for a lithium-halogen cell comprising the steps of:
    (a) forming a film of an organic electron donor material having a predetermined thickness and shape;
    (b) providing a lithium element having a surface adapted to be operatively associated with the cathode in the cell;
    (c) placing said film on said surface of said lithium element;
    (d) applying pressure to bond said film to said surface of said lithium element; and
    (e) said step of applying pressure comprising providing a pair of mold sections, placing said film and lithium element between said mold sections and bringing said mold sections together and against said film and lithium element, and applying pressure through said mold sections to said film and lithium element.

2. A method according to claim 1, wherein said step of forming said film comprises dissolving organic electron donor material in a solvent, pouring the resulting liquid into a mold defining the thickness and area dimensions of said film, allowing said liquid to dry in said mold and removing said film from said mold.

3. A method according to claim 2, further including the step of cutting said film to a desired peripheral configuration.

4. A method according to claim 1, wherein said organic electron donor material comprises polyvinyl pyridine.

5. A method according to claim 1, further including shaping said film and said lithium element to provide formations which increase the anode surface area during said step of applying pressure.

6. A method according to claim 1, wherein a pair of said films and a pair of said lithium elements are provided and a film of each pair is placed on a surface of a corresponding one of said lithium elements, and further including providing an anode current collector and lead assembly, placing said assembly between and in contact with the surfaces of said lithium not contacted by said flims and applying pressure to bond said lithium elements to each other and to said anode current collector and a portion of said anode lead in sealing relation and to bond said films to the corresponding surfaces of said lithium elements.

7. A method according to claim 6, wherein said step of applying pressure comprises placing the arrangement of said anode current collector and lead assembly, lithium elements and films between said mold sections and bringing said mold sections together and against said films, and applying pressure through said mold sections to said films, lithium elements and anode current collector-lead assembly.

8. A method according to claim 6, further including shaping said films and said lithium elements to provide formations on opposite surfaces of said anode which increase the anode surface area during said step of applying pressure.

9. A method according to claim 1 wherein said film is formed in the shape of an envelope and said lithium element is inserted in the envelope to place said film on said surface of said lithium element.

10. A method according to claim 1, wherein said film is formed in the shape of an envelope and a pair of said lithium elements are provided and further including providing an anode current collector and lead assembly, placing said assembly between and in contact with surfaces of said lithium elements, inserting the combination of said lithium plates and anode current collector and lead assembly in said envelope and applying pressure to bond said lithium elements to each other and to said current collector and a portion of said anode lead in sealing relation and to bond said envelope to the corresponding surfaces of said lithium elements.

11. A method according to claim 1, wherein the cathode of the cell contains a charge transfer complex of an organic donor component and halogen.

* * * * *